US007350827B2

(12) United States Patent
Zeigler

(10) Patent No.: US 7,350,827 B2
(45) Date of Patent: Apr. 1, 2008

(54) CAM EXPANSION RING ASSEMBLY

(75) Inventor: Bryan N Zeigler, Fort Wayne, IN (US)

(73) Assignee: Press-Seal Gasket Corporation, Fort Wayne, IN (US)

( * ) Notice: Subject to any disclaimer, the term of this patent is extended or adjusted under 35 U.S.C. 154(b) by 141 days.

(21) Appl. No.: 11/097,001

(22) Filed: Apr. 1, 2005

(65) Prior Publication Data

US 2006/0220377 A1    Oct. 5, 2006

(51) Int. Cl.
*F16L 21/00* (2006.01)
*E02D 29/14* (2006.01)

(52) U.S. Cl. .................. 285/235; 285/230; 285/417; 285/420; 52/20; 24/270

(58) Field of Classification Search ............... 285/230, 285/236, 235, 420, 417; 29/525.01; 24/270, 24/272; 52/20; 248/231.9, 231.91; 74/567, 74/568 R, 569, 568 B
See application file for complete search history.

(56) References Cited

U.S. PATENT DOCUMENTS

| | | | | |
|---|---|---|---|---|
| 1,934,769 A | * | 11/1933 | Reynolds | 188/337 |
| 2,049,847 A | * | 8/1936 | Lockhart | 220/321 |
| 2,101,813 A | * | 12/1937 | Lockhart | 292/256.69 |
| 2,101,814 A | * | 12/1937 | Lockhart | 292/256.69 |
| 2,130,701 A | * | 9/1938 | Thomas | 220/321 |
| 2,935,340 A | * | 5/1960 | St. Marie | 285/18 |
| 2,967,627 A | * | 1/1961 | Vinson | 254/2 R |
| 3,776,517 A | * | 12/1973 | Davis et al. | 254/332 |
| 3,861,225 A | | 1/1975 | Mattson | 74/54 |
| 3,910,557 A | * | 10/1975 | Merriman | 254/369 |
| 4,097,171 A | * | 6/1978 | Fier | 404/26 |
| 4,469,467 A | * | 9/1984 | Odill et al. | 404/25 |
| 4,478,437 A | | 10/1984 | Skinner | 285/189 |
| 4,711,455 A | * | 12/1987 | Ditcher et al. | 277/616 |
| 4,715,626 A | | 12/1987 | Gehring et al. | 285/230 |
| 4,890,863 A | * | 1/1990 | Westhoff et al. | 277/606 |
| 5,029,907 A | * | 7/1991 | Gundy | 285/230 |
| 5,054,794 A | | 10/1991 | Westhoff et al. | 277/1 |
| 5,150,927 A | | 9/1992 | Skinner | 285/189 |
| 5,263,230 A | * | 11/1993 | Johnson | 24/19 |
| 5,269,494 A | * | 12/1993 | Pittman et al. | 254/17 |
| RE34,550 E | * | 2/1994 | Bowman | 404/26 |

(Continued)

*Primary Examiner*—Daniel P. Stodola
*Assistant Examiner*—Jay R Ripley
(74) *Attorney, Agent, or Firm*—Baker & Daniels LLP

(57) ABSTRACT

An expansion ring assembly and method for sealingly installing a gasket within an opening in a wall of a structure. The expansion ring assembly includes an expansion ring having first and second adjacent end portions, and first and second cam members are rotatably coupled to the first and second end portions. Each cam member includes tool engagement structure for rotating the cam members, and cam surfaces of the cam members are engageable with one another such that, upon rotation of each cam member, the cam surface thereof engages the cam surface of the other cam member to drive the first and second end portions of the ring apart from one another, thereby radially expanding the ring to compress a gasket into sealing engagement with the wall opening. Only one cam member may be rotated, or alternatively, both cam members may be rotated sequentially, depending upon the amount of expansion which is needed. The expansion ring assembly also includes structures which prevent reverse rotation of the cam members to lock the expansion ring in its radially expanded condition, and optionally, may include only a single cam member.

19 Claims, 6 Drawing Sheets

U.S. PATENT DOCUMENTS

| | | | |
|---|---|---|---|
| 5,316,407 A | 5/1994 | Miller | 404/25 |
| 5,431,459 A | 7/1995 | Gundy | 285/237 |
| 5,435,419 A * | 7/1995 | Muzzy | 188/79.56 |
| 5,474,396 A * | 12/1995 | Bravo | 404/26 |
| 5,478,050 A * | 12/1995 | Ott | 254/17 |
| 5,496,128 A | 3/1996 | Odill | 404/25 |
| 5,507,500 A | 4/1996 | Skinner et al. | 277/9 |
| 5,517,931 A | 5/1996 | Kawaguchi | 111/118 |
| 5,570,890 A | 11/1996 | Skinner et al. | 277/101 |
| 5,605,319 A * | 2/1997 | Reiley | 254/17 |
| 5,642,891 A | 7/1997 | Skinner | 277/101 |
| 5,732,955 A | 3/1998 | Skinner et al. | 277/101 |
| 5,954,344 A | 9/1999 | Miller | 277/616 |
| 6,230,417 B1 * | 5/2001 | Smith | 33/651 |
| 6,607,219 B2 | 8/2003 | Mirales et al. | 285/236 |
| 6,805,359 B2 | 10/2004 | Neuhaus et al. | 277/576 |
| 6,866,301 B2 * | 3/2005 | Brockway | 285/236 |
| 6,955,498 B1 * | 10/2005 | McCuan et al. | 404/25 |
| 2003/0230860 A1 | 12/2003 | Mirales et al. | 277/630 |
| 2005/0006853 A1 * | 1/2005 | Neuhaus et al. | 277/576 |

* cited by examiner

FIG_1

FIG_7

CAM EXPANSION RING ASSEMBLY

BACKGROUND OF THE INVENTION

1. Field of the Invention

The present invention relates to an expansion ring assembly for sealingly installing a gasket within the opening of a structure to provide a sealed connection between the structure and a pipe extending through the structure opening.

2. Description of the Related Art

In underground pipe systems, it is often necessary to connect a pipe in a sealed manner within an opening in the wall of a structure, such as a manhole riser or monolithic base, or a septic tank or fluid distribution box, for example. Typically, a flexible elastomeric gasket is placed within the opening in the wall, followed by fitting an expansion ring against the interior surface of the gasket. A suitable expansion mechanism is used to radially expand the expansion ring and to lock the ring in an expanded condition in which the gasket is sealingly compressed between the expansion ring and the opening in the wall of the structure. Thereafter, a pipe is inserted through the gasket, and one or more external take-down clamps are installed around a boot portion of the gasket which extends from the wall to sealingly compress the gasket boot between the clamps and the outer surface of the pipe. In this manner, a sealed connection is made between the pipe and the structure.

One known expansion ring includes a ratcheting engagement between overlapping ends of the ring. When the ends of the ring are forced in opposite directions from one another as the ring is radially expanded, ratchet teeth on the ring ends sequentially engage one another, wherein the expansion ring may be sequentially expanded in an incremental manner into multiple locked positions. A separate tool, such as a hydraulic or pneumatic jack, is used to engage the opposite ends of the expansion ring and to drive same apart from one another. Typically, such tools can be cumbersome to use in the field and tend to be expensive, as the tools are custom designed for use only with particular types of expansion rings.

Other known expansion mechanisms for expansion rings include cooperating, linearly movable, wedge-type cams which are actuated by rotating a threaded bolt which extends through portions of the cams. These devices tend to include a large number of parts, are spatially cumbersome and bulky and, due to the need to rotatably drive the threaded bolt, cannot be installed quickly.

What is needed is an expansion ring assembly which is an improvement over the foregoing.

SUMMARY OF THE INVENTION

The present invention provides an expansion ring assembly and method for sealingly installing a gasket within an opening in a wall of a structure. The expansion ring assembly includes an expansion ring having first and second adjacent end portions, and first and second cam members are rotatably coupled to the first and second end portions. Each cam member includes tool engagement structure for rotating the cam members, and cam surfaces of the cam members are engageable with one another such that, upon rotation of each cam member, the cam surface thereof engages the cam surface of the other cam member to drive the first and second end portions of the ring apart from one another, thereby radially expanding the ring to compress a gasket into sealing engagement with the wall opening. Only one cam member may be rotated, or alternatively, both cam members may be rotated sequentially, depending upon the amount of expansion which is needed. The expansion ring assembly also includes structures which prevent reverse rotation of the cam members to lock the expansion ring in its radially expanded condition, and, optionally, may include only a single cam member.

In one embodiment, the expansion ring includes a substantially flat base wall with two side walls extending radially inwardly from the base wall, and a pair of opposing end portions to which the cam members are rotatably coupled. The cam members may include one-way clutches to permit rotation of the cam members in a first direction and prevent rotation of the cam members in an opposite direction. The cam members each further include lobed-shaped cam surfaces engageable with one another. An oversleeve element having a base wall and a pair of radially inwardly extending side walls overlaps the ends of the expansion ring to confine the movement of the ring end portions to circumferential expanding movement and thereby prevent movement of the expansion ring ends laterally away from one another during expansion of the expansion ring.

To install a gasket within the opening of a wall, the expansion ring assembly is fitted within the gasket, either before or after the gasket is seated within the opening. Thereafter, one of the cam members is rotated to engage the lobed cam surface thereof with the other cam member and thereby drive the ends of the expansion ring apart from one another to expand the ring and radially compress the gasket against the opening. If further expansion of the expansion ring is needed, the other cam member is also rotated to further expand the expansion ring and further radially compress the gasket against the opening. Thereafter, a pipe may be installed through the gasket in a suitable, known manner.

Advantageously, the present expansion ring assembly provides a pair of rotatable cam members which may be rotated using simple tools, eliminating the need for expensive, large, and cumbersome tools. For example, in one embodiment, a torque wrench with an Allen wrench fitting is used, wherein the torque wrench is calibrated to release or "break" upon a desired torque which indicates to the installer that the gasket is sufficiently compressed between the expansion ring and the wall opening to provide an adequate and uniformly reproducible seal.

Additionally, the cam members are shaped such that only a rotation of 90° or less of each cam member is needed to sufficiently expand the expansion ring, thereby facilitating a very quick and easy installation. The cam members of the expansion ring assembly are also thinly-profiled, allowing easy access to the cam members from either inside or outside the structure during installation and/or field maintenance.

In an alternative embodiment, the expansion ring assembly includes only a single cam member rotatably coupled to one of the expansion ring end portions. Upon rotation of the cam member during installation, the cam surface of the cam member engages an abutment surface on the other expansion ring end to force the end portions apart from one another and thereby expand the expansion ring. The forgoing type of expansion ring assembly may be less expensive to produce for use in applications where less expansion of the expansion ring is needed than an expansion ring assembly which includes a pair of cam members.

In one form thereof, the present invention provides an expansion ring assembly, including a ring having first and second adjacent end portions; a first cam member rotatably coupled to the first ring end portion, the first cam member having a cam surface engageable with at least a portion of the second ring end portion upon rotation of the first cam member to drive the first and second ring end portions apart from one another and thereby radially expand the ring.

In another form thereof, the present invention provides an expansion ring assembly, including a ring having first and second adjacent end portions; first and second cam members rotatably coupled to the first and second end portions, respectively, the first and second cam members each having a cam surface engageable with the other cam member upon rotation thereof to drive the first and second ring end portions apart from one another and thereby radially expand the ring.

In a further form thereof, the present invention provides a method of installing a gasket within an opening in a wall, including the steps of fitting a gasket within the opening; radially expanding an expansion ring disposed within the gasket by rotating a first cam member associated with a first end portion of the ring to engage a cam surface of the first cam member with at least a portion of an adjacent, second end portion of the ring to drive the first and second ring end portions apart from one another and thereby compress the gasket against the wall opening.

BRIEF DESCRIPTION OF THE DRAWINGS

The above-mentioned and other features and advantages of this invention, and the manner of attaining them, will become more apparent and the invention itself will be better understood by reference to the following description of an embodiment of the invention taken in conjunction with the accompanying drawings, wherein.

Corresponding reference characters indicate corresponding parts throughout the several views. The exemplifications set out herein illustrate exemplary embodiments of the invention, and such exemplifications are not to be construed as limiting the scope of the invention in any manner.

DETAILED DESCRIPTION

Figure 1:
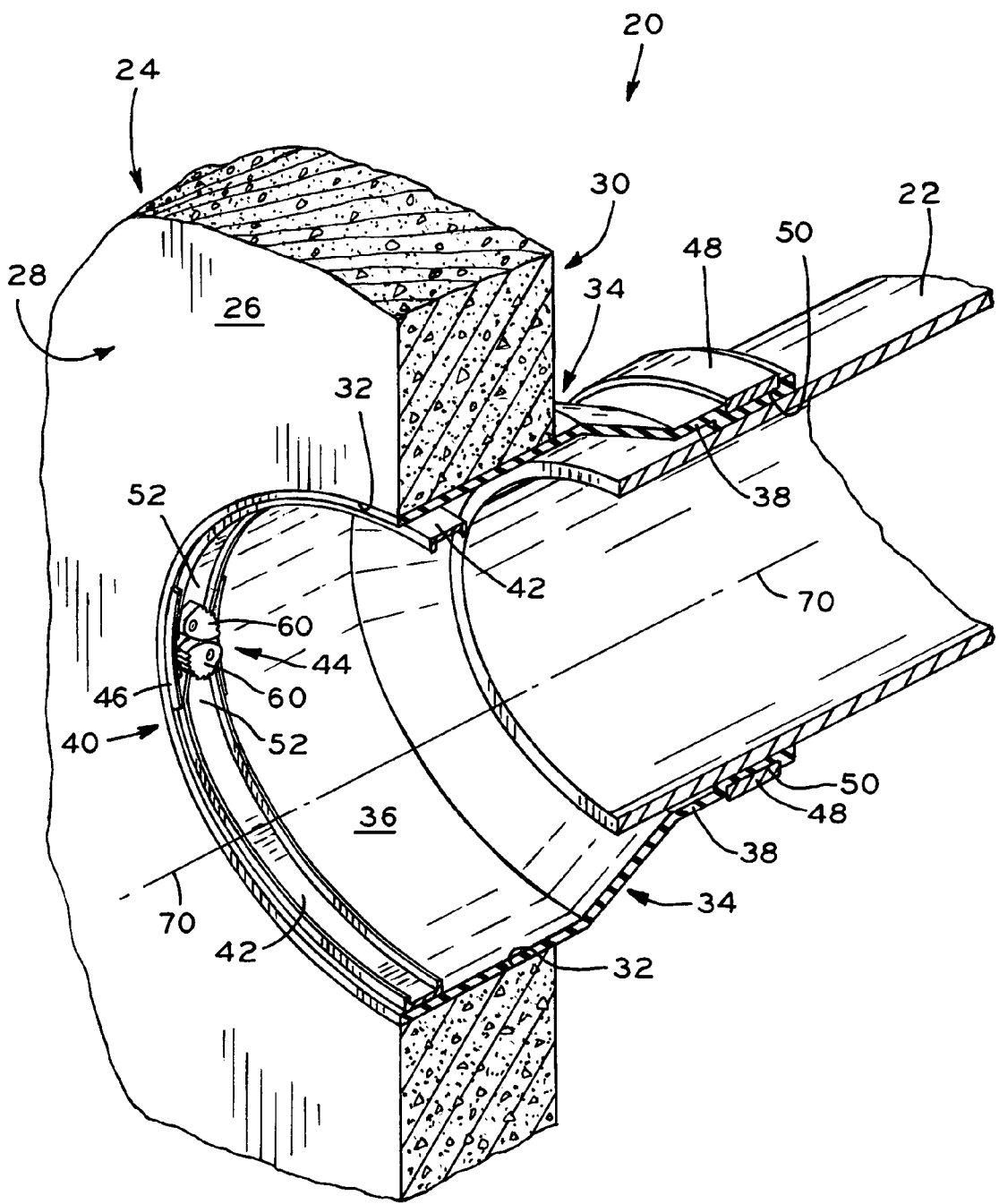
FIG. 1 is a partial sectional view of a connection between a structure and a pipe using a gasket which is sealingly secured within an opening in a wall of the structure with an expansion ring assembly of the present invention.

Referring to FIG. 1, an exemplary pipe connection 20 in an underground pipeline system is shown, in which a pipe 22 is connected to a structure 24, such as a manhole riser or monolithic base, or a septic tank or fluid distribution box, for example. Structure 24 may be formed of concrete, fiberglass, metal, plastic, or any other suitable rigid material. The structure includes wall 26 having an interior side 28 defining the interior of structure 24 and an exterior side 30 defining the exterior of structure 24. Additionally, wall 26 includes a circular opening 32.

An exemplary expansion-type gasket 34, shown in FIG. 1, includes a body portion 36 disposed within opening 32 of wall 26, and a boot portion 38 extending from body portion 36. Gasket 34 may be made from any suitable flexible, elastomeric material such as a thermoset rubber or a thermoplastic elastomer for example, and provides a sealed connection between opening 32 in wall 26 and pipe 24. Optionally, body portion 36 of gasket 34 may be made of a relatively rigid material, while boot portion 38 is made from a relatively resilient, compressible material. Body portion 36 of gasket 34 is sealingly engaged with opening 32 by expansion ring assembly 40, described in detail below, which generally includes expansion ring 42, drive mechanism 44, and oversleeve 46. As discussed in detail below, expansion ring assembly 40 is radially expandable to compress body portion 36 gasket 34 into sealing engagement with opening 32 in wall 26 to provide a fluid tight seal therebetween.

After body portion 36 of gasket 34 is sealingly engaged with opening 32 of wall 26 by expansion ring assembly 40 as described below, boot portion 38 of gasket 34 is connected to pipe 22 by inserting pipe 22 through boot portion 38, followed by installing one or more known take-down clamps 48 around boot portion 38 of gasket 34 and tightening clamps 48 to compress boot portion 38 of gasket 34 into sealing engagement with the outer surface of pipe 22 to provide a fluid tight seal therebetween. Boot portion 38 of gasket 34 may optionally include one or more annular recessed seats 50 for locating clamps 48 on boot portion 38 of gasket 34.

In FIG. 1, only a portion of the length of pipe 22 is shown for clarity, it being understood that pipe 22 may extend at least some distance past expansion ring assembly 40 through opening 32 in wall 26, past interior side 28 of wall 26, and into the interior of structure 24. Further, the pipe connection 20 of FIG. 1 may also be installed in a manner in which boot portion 38 of gasket 34 extends inwardly of wall 26, in essentially the opposite manner shown in FIG. 1, such that clamps 48 are disposed within structure 24.

Figure 2:
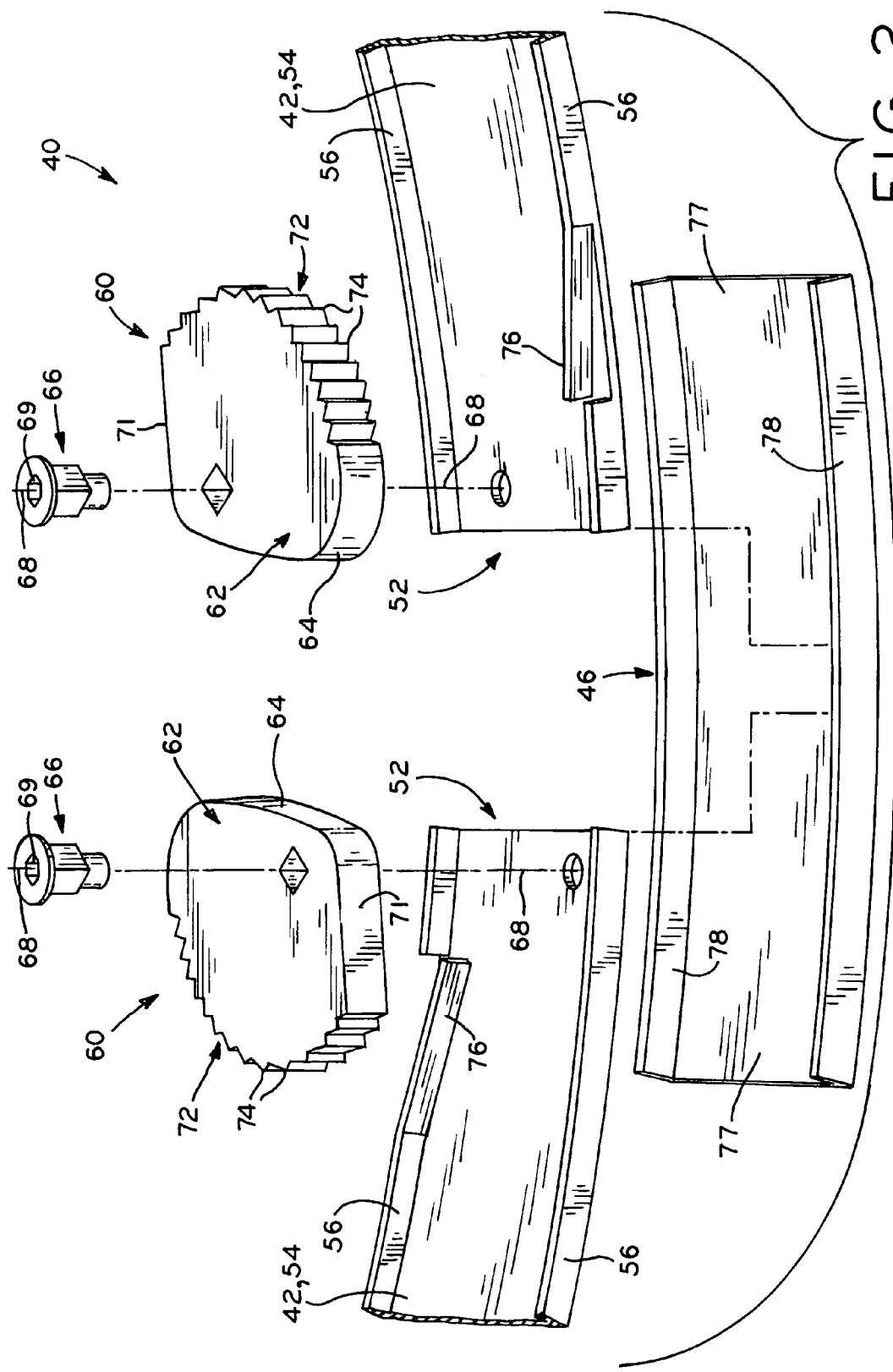
FIG. 2 is an exploded view of the components of a first embodiment of the expansion ring assembly of FIG. 1.

Referring to FIG. 2, the components of expansion ring assembly 40 are shown. Except as described below, expansion ring 42 is substantially similar to that disclosed in U.S. Pat. No. 6,805,359, assigned to the assignee of the present invention, the disclosure of which is expressly incorporated herein by reference. Expansion ring 42 is made of a continuous strip of material, such as stainless steel or other metals, or a plastic, for example, and includes a pair of adjacent, opposing end portions 52. Expansion ring 42 also includes base wall 54 having an outer surface for engaging the interior of body portion 36 of gasket 34, and a pair of side walls 56 projecting radially inwardly from opposite sides of base wall 54, such that base wall 54 and side walls 56 together define a generally U-shaped cross sectional profile for expansion ring 42. Alternatively, expansion ring 42 may have a flat profile, including only base wall 54.

Drive mechanism 44 generally includes a pair of cam members 60 rotatably coupled to respective end portions 52 of expansion ring 42. Cam members 60 may be made from cast or machined metal, or alternatively, may be made of a molded rigid plastic material such as polyethylene, polypropylene, or polyether ether ketone (PEEK). Cam members 60 each include a lobe portion 62 having an outwardly curved or lobed cam surface 64, and cam surfaces 64 of cam members 60 initially engage one another when expansion ring assembly 40 is placed within gasket 34, as shown in FIG. 3 and described below.

Cam members 60 are rotatably coupled to end portions 52 of expansion ring 42 via pivot connectors 66 which, in the embodiment of FIGS. 2-5, are shown as rivet-like fittings which are non-rotatably coupled with, or fitted to, cam members 60 via cooperating square profiles of pivot connectors 66 and cam members 60 or any other suitable coupling. Pivot connectors 66 also pivotally connect cam members 60 to respective end portions 52 of expansion ring 42 such as via a rivet connection or via nuts (not shown) or other fasteners attached to the ends of pivot connectors 66. Optionally, pivot connectors 66 may be cast or molded integrally with cam members 60, or may take the form of a bolt with corresponding nuts. Pivot connectors 66 define rotational axes 68 of each cam member 60 which are perpendicular to the longitudinal axis 70 (FIG. 1) of expansion ring 42.

As may be seen from FIG. 2, cam members 60 may be identical to one another, wherein one cam member 60 is disposed in an orientation which is rotated 180° with respect to the other, and wherein pivot connectors 66 and the associated pivot axes 68 of cam members 60 are laterally offset. Optionally, cam members 60 may have differing cam profiles, as discussed below. Pivot connectors 66 also each include tool-receiving structure, shown herein as hexagonal Allen wrench fittings 69, for engagement by a suitable tool to rotate cam members 60. Alternatively, the tool-receiving structure may have other configurations adapted for rotational engagement by suitable tools.

Figure 3:
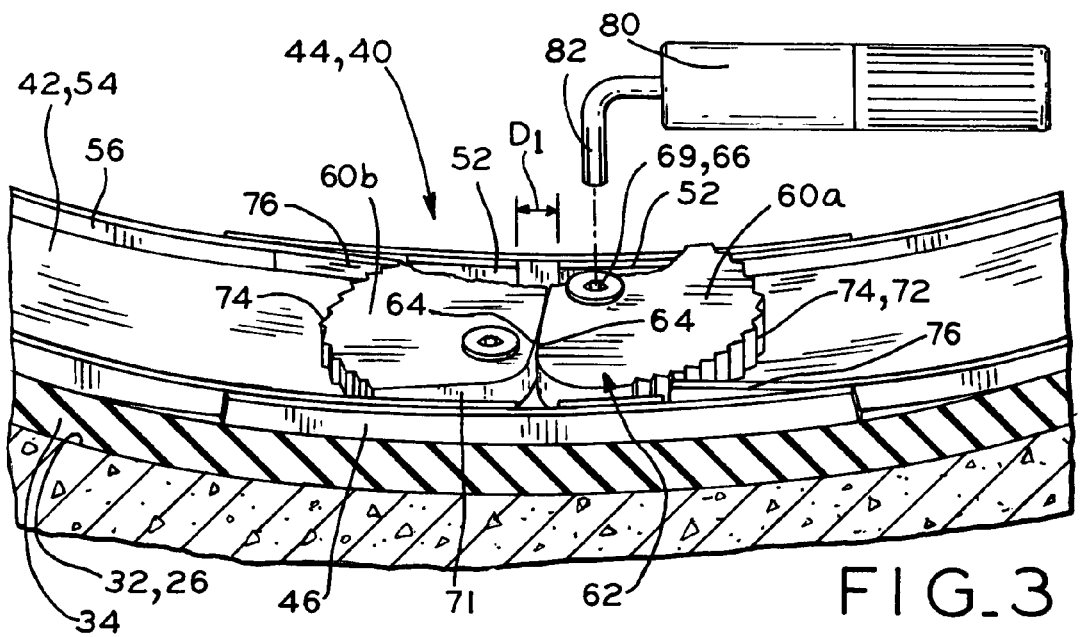
FIG. 3 is a fragmentary view of a portion of the pipe connection of FIG. 1, showing the expansion ring assembly of FIG. 2 in a initial, non-expanded condition, and further showing portions of the cam members cut away to show the expansion ring ends.

In the embodiment shown in FIGS. 1-5, cam members 60 additionally include straight sides 71 which initially contact side walls 56 of expansion ring end portions 52, as shown in FIG. 3, and further include arcuate ratchet portions 72 each including a plurality of ratchet teeth 74 which, upon rotation of cam members 60, are sequentially engaged by respective ends of spring arms 76 which are punched from side walls 56 of end portions 52 of expansion ring 42.

Oversleeve 46 comprises an arcuate-shaped segment of a rigid material, such as a metal or a rigid plastic, and includes base wall 77 and a pair of side walls 78 projecting radially inwardly therefrom to define a U-shaped cross sectional profile which is complementary to that of expansion ring 42. However, oversleeve 46 is generally slightly wider than expansion ring 42, such that oversleeve 46 may overlap end portions 52 of expansion ring 42 with end portions 52 nested between side walls 78 of oversleeve 46. In this manner, when end portions 52 of expansion ring 42 are nested within oversleeve 46 during installation, oversleeve 46 prevents end portions 52 of expansion ring 42 from moving laterally with respect to one another in opposite directions generally parallel to longitudinal axis 70 of expansion ring 42 during radial expansion of expansion ring 42.

Figure 4:
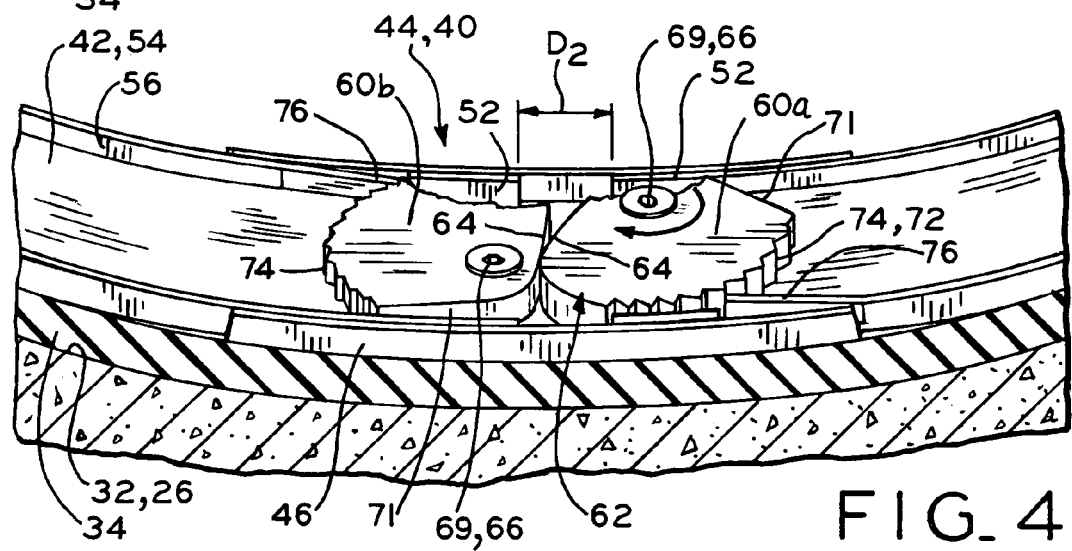
FIG. 4 is a continuation of FIG. 3, showing the rotation of one of the cam members to radially expand the expansion ring, and further showing portions of the cam members cut away to show the expansion ring ends.
Figure 5:
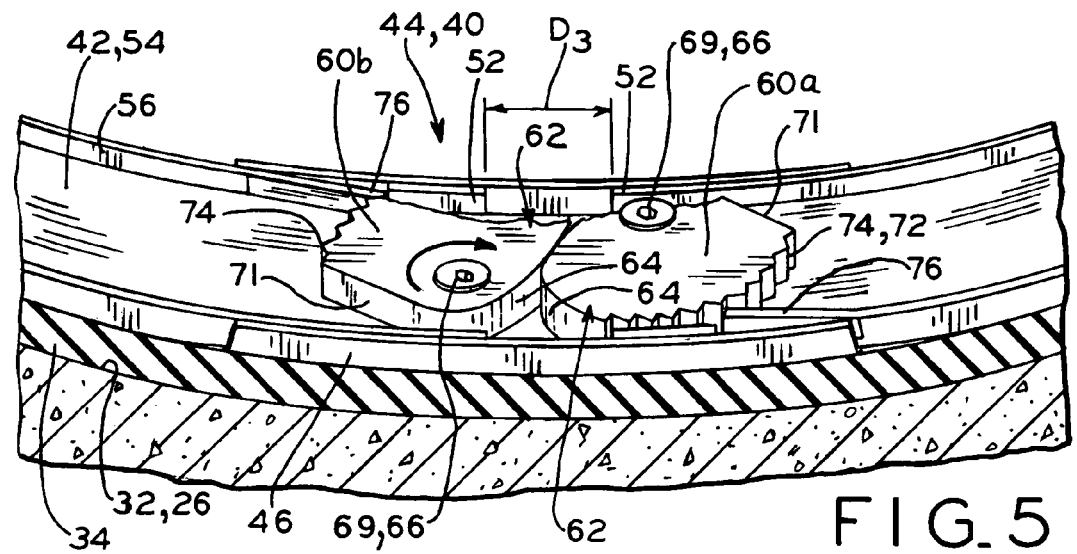
FIG. 5 is a continuation of FIG. 4, showing the rotation of the other of the cam members to further radially expand the expansion ring, and further showing portions of the cam members cut away to show the expansion ring ends.

Referring to FIGS. 3-5, installation of gasket 34 within opening 32 of wall 26 using expansion ring assembly 40 will now be described. First, gasket 34 is seated within opening 32 in wall 26, with expansion ring assembly 40 fitted within gasket 34 either before or after gasket 34 is seated within opening 32. Initially, as shown in FIG. 3, drive mechanism 44 and cam members 60 of expansion ring 42 are disposed in the position shown, in which end portions 52 of expansion ring 42 are closely adjacent one another, and cam surfaces 64 of cam members 60 are in contact with one another. In particular, end portions 52 of expansion ring 42 are initially separated by a relatively small distance $D_1$. Additionally, spring arms 76 of end ring portions 52 either are out of engagement with ratchet teeth 74 of cam members 60, or are in engagement with initial ones of ratchet teeth 74 along ratchet portions 72 of cam members 60. Although drive mechanism 44 is shown in a lower, substantially six o'clock position in FIGS. 3-5 for clarity, it should be understood that in field installations, drive mechanism 44 may be located in any position around the circumference of gasket 34 and opening 32 in wall 26 as may be required.

Thereafter, a tool such as torque wrench 80 with Allen wrench fitting 82 is engaged with the tool fitting 69 one of cam members 60, such as the cam member which is shown to the right in FIGS. 3-5 and designated 60a, to rotate same to initiate radial expansion of expansion ring 42. Torque wrench 80 may be calibrated to release or "break" when a certain torque is reached at any time during the installation procedure to indicate to the installer that expansion ring 42 has been expanded to a sufficient extent. Optionally, a powered tool, as opposed to a manual torque wrench, may be used to expand end portions 52 of expansion ring 42 in the manner described below.

As shown in FIG. 4, as cam member 60a rotates, cam surface 64 thereof progressively engages cam surface 64 of the other cam member 60 shown in FIGS. 3-5, designated 60b, to cause cam member 60a and its associated end portion 52 of expansion ring 42 to move apart from the opposing cam member 60b and its associated end portion 52 of expansion ring 42 to radially expand expansion ring 42 and concurrently begin compressing gasket 34 against opening 32 in wall 26. Concurrently, spring arm 76 sequentially engages ratchet teeth 74 of cam member 60a to prevent reverse rotation of cam member 60a and to thereby lock expansion ring 42 in progressively greater radially expanded positions.

As shown between FIGS. 3 and 4, cam member 60a may be rotated approximately 90° to separate end portions 52 by a relatively larger distance $D_2$. At any time during rotation of cam member 60a, torque wrench 80 may "break", indicating that expansion ring 42 has been expanded to an extent necessary to sufficiently compress gasket 34 against opening 32 in wall 26.

As shown in FIG. 5, if further expansion of expansion ring 42 is needed, torque wrench 80 is then used to rotate the other cam member 60b wherein, as cam member 60b rotates, cam surface 64 thereof progressively engages cam surface 64 of cam member 60a to cause cam member 60b and its associated end portion 52 of expansion ring 42 to move further apart from the opposing cam member 60a and its associated end portion 52 of expansion ring 42 to further radially expand expansion ring 42 and continue compressing gasket 34 against opening 32 in wall 26. Concurrently, spring arm 76 sequentially engages ratchet teeth 74 of cam member 60b to prevent reverse rotation of cam member 60b and thereby lock expansion ring 42 in progressively greater radially expanded positions.

As shown between FIGS. 4 and 5, cam member 60b may be rotated approximately 90° to separate end portions 52 by a still larger distance $D_3$ and, at any time during rotation of cam member 60a, torque wrench 80 may "break", indicating that expansion ring 42 has been expanded to an extent necessary to sufficiently compress gasket 34 against opening 32 in wall 26.

Advantageously, as may be seen from FIGS. 3-5, cam members 60a and 60b may be configured for rotation in the same direction, shown herein as clockwise, which facilitates easy installation by not requiring the installer to rotate cam members 60a and 60b in opposite directions. Thus, to sequentially rotate cam members 60a and 60b, the installer need simply engage one cam member 60a or 60b with a tool, rotate same in a clockwise direction, and then engage the other cam member 60a or 60b with the tool and rotate same in the same, clockwise direction, wherein at any point in the foregoing procedure when expansion ring 42 is expanded to sufficiently compress gasket 34, torque wrench 80 will "break" to indicate to the user that installation is complete. As will be apparent from the above, cam members 60a and 60b may optionally be configured for rotation in counterclockwise directions, or in opposite directions from one another, as needed.

Although cam members 60a and 60b are identical to one another in the embodiment described above, the cam lobe portions 62 and/or cam surfaces 64 thereof, for example, may differ. For example, one cam member 60a or 60b may have a relatively large, or relatively greater projecting lobe portion 62 such that, when such cam member is rotated, end portions 52 of expansion ring 42 are forced apart from one another to a greater extent, while the other cam member 60a or 60b may have a relatively smaller, or relatively lesser projecting lobe portion 62 such that, when such cam member is rotated, end portions 52 of expansion ring 42 are forced apart from one another to a lesser extent. In this manner, the first of the foregoing cam members may be rotated for an initial "coarse" expansion of expansion ring 42, and the foregoing second cam member may be subsequently rotated for a "fine" adjustment of the degree of expansion of expansion ring 42. As also will be apparent from the foregoing, the first of the foregoing cam members may require less rotational torque for the initial expansion, with the second of the foregoing cam members requiring more rotational torque for the continued expansion as the gasket is further compressed. Also, cam members in excess of two may be used.

Figure 6:
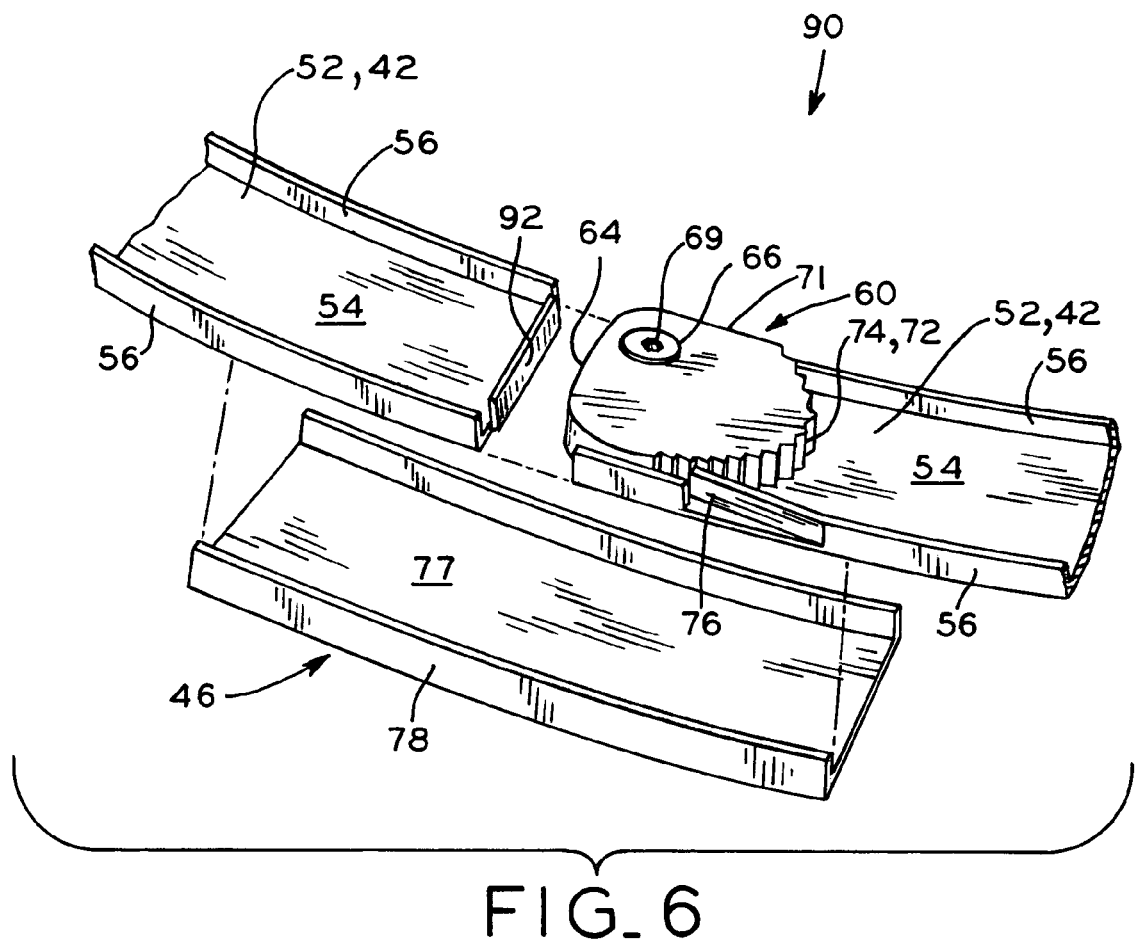
FIG. 6 is a perspective view of an expansion ring assembly according to a second embodiment, including a single cam member.

A second embodiment of an expansion ring assembly according to the present invention is shown in FIG. 6. Except as described below, expansion ring assembly 90 of FIG. 6 is substantially identical to expansion ring assembly 40 of FIGS. 1-5 discussed above, and identical reference numerals will be used to designate identical or substantially identical features therebetween. As shown in FIG. 6, expansion ring assembly 90 includes expansion ring 42 having a pair of adjacent end portions 52, wherein one of the end portions 52 includes a cam member 60 which may be identical to those of expansion ring assembly 40. The other end portion 52 of expansion ring 42 includes an abutment surface 92 which, as shown in FIG. 6, may be formed as a flange which is bent from base wall 54 of expansion ring 42, for example. Alternatively, a separate component such as a block of rigid material may be secured to the end portion 52 of expansion ring 42 to provide a reaction surface for cam member 60, as discussed below.

In operation, expansion ring assembly 90 operates substantially identically to expansion ring assembly 40 discussed above, except that rotation of the cam member 60 of expansion ring assembly 90 causes cam surface 64 thereof to contact abutment surface 92 of the opposite end portion 52 of expansion ring 42 to thereby force end portions 52 apart from one another to expand expansion ring 42. As will be apparent, expansion ring assembly 90 may not be expanded to the extent of expansion ring assembly 40 because expansion ring assembly 90 includes only a single cam member 60. However, expansion ring assembly 90 may be less expensive to produce than expansion ring assembly 40 for use in applications where less expansion of expansion ring 42 is needed. Although spring arm 76 is shown in FIG. 6 adjacent cam member 60a, contact abutment surface 92 of the opposite end portion 52 of expansion ring 42 could also be configured to engage teeth 74 of cam member 60a.

Figure 7:
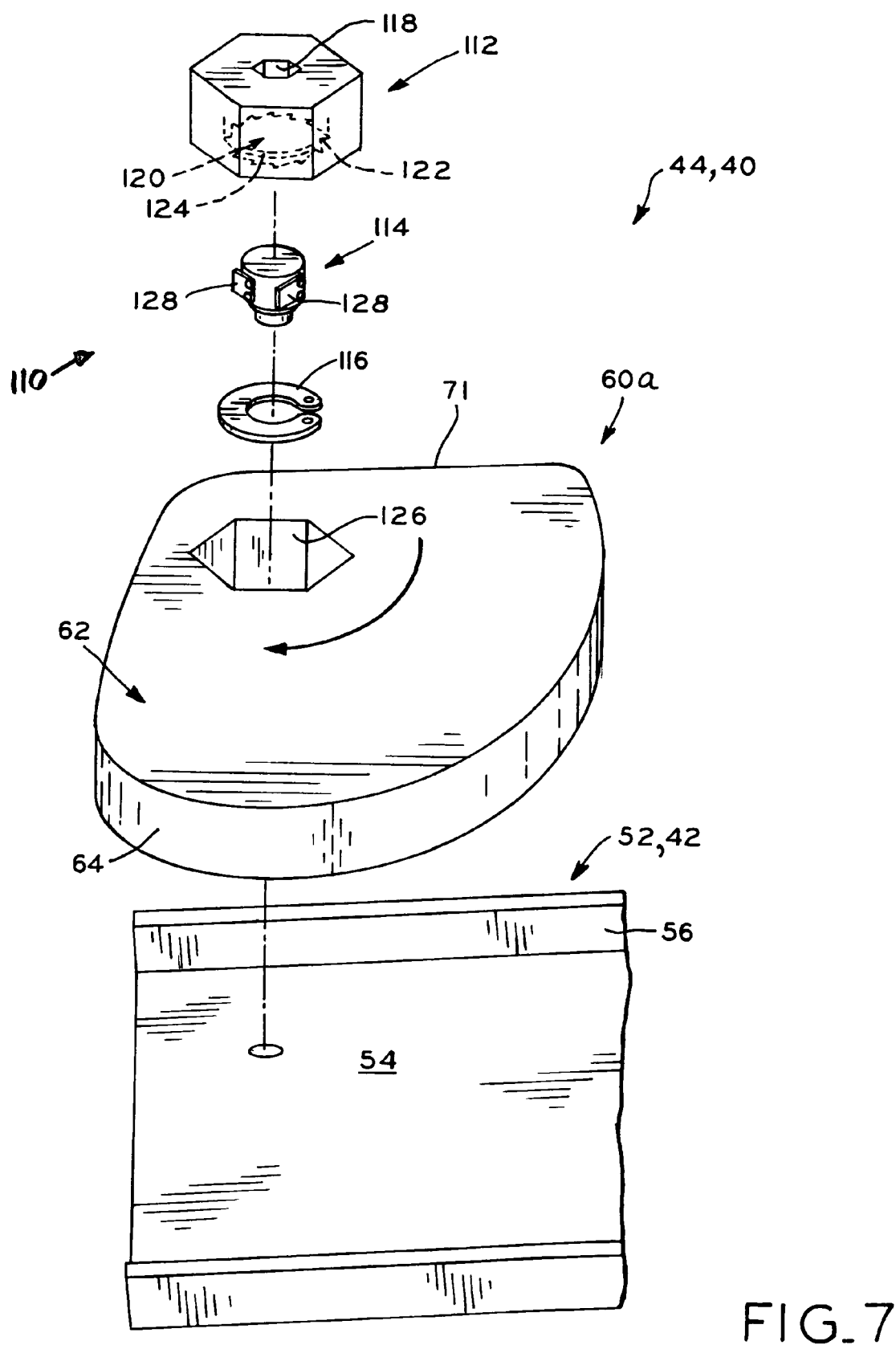
FIG. 7 is a perspective exploded view of a portion of an expansion ring assembly including a one-way clutch mechanism associated with a cam member thereof.

Referring to FIG. 7, one or both of cam members 60a and 60b of the drive mechanism 44 of expansion ring assembly 40 may include a one-way clutch mechanism to allow rotation of cam members 60a and 60b in a first direction and to prevent rotation of cam members 60a and 60b in a second direction. The exemplary clutch mechanism 110 shown in FIG. 7 generally includes clutch nut 112, clutch member 114, and retaining ring 116. Clutch nut 112 includes tool fitting 118 for receiving a suitable tool, such as an Allen wrench, for example, and also includes central bore 120 having a plurality of notches 122 therearound and an annular groove 124 at the lower portion of central bore 120. Clutch nut 112 has a hexagonal profile, and is received within a hexagonal opening 126 in cam member 60a. Clutch nut 112 may be a metal or rigid plastic insert which is molded into cam member 60a, or alternatively, clutch nut 112 may be formed as an integral portion of cam member 60a.

Clutch member 114 has a cylindrical profile, and is fixedly riveted to base wall 54 of end portion 52 of expansion ring 42 or attached thereto with a suitable fastener. Clutch member 114 is received within central bore 120 of clutch nut 112, and retaining ring 116 is received within annular groove 124 of clutch nut 112 to rotatably retain clutch nut 112 to clutch member 114. Clutch member 114 includes a plurality of pawls 128 therearound which selectively engage notches 122 of clutch nut 112.

In operation, rotation of clutch nut 112 and cam member 60 using a suitable tool causes pawls 128 of clutch member 114 to sequentially engage notches 122 of clutch nut 112 to thereby prevent reverse rotation of cam member 60a. Otherwise, drive mechanism 44 operates substantially identically as the embodiment described above with respect to FIGS. 3-5. Notably, however, forming cam members 60a and/or 60b with clutch mechanisms 110 allows cam members 60a and 60b and end portions 54 of expansion ring 42 to be formed without ratchet teeth 74 and spring arms 76, respectively. Although an exemplary clutch mechanism 110 has been described above, one of ordinary skill in the art will appreciate that other types of clutch mechanisms, or clutch bearing assemblies, may be used with cam members 60a and 60b to allow rotation thereof in a first direction and to prevent rotation thereof in a second direction.

Figure 8:
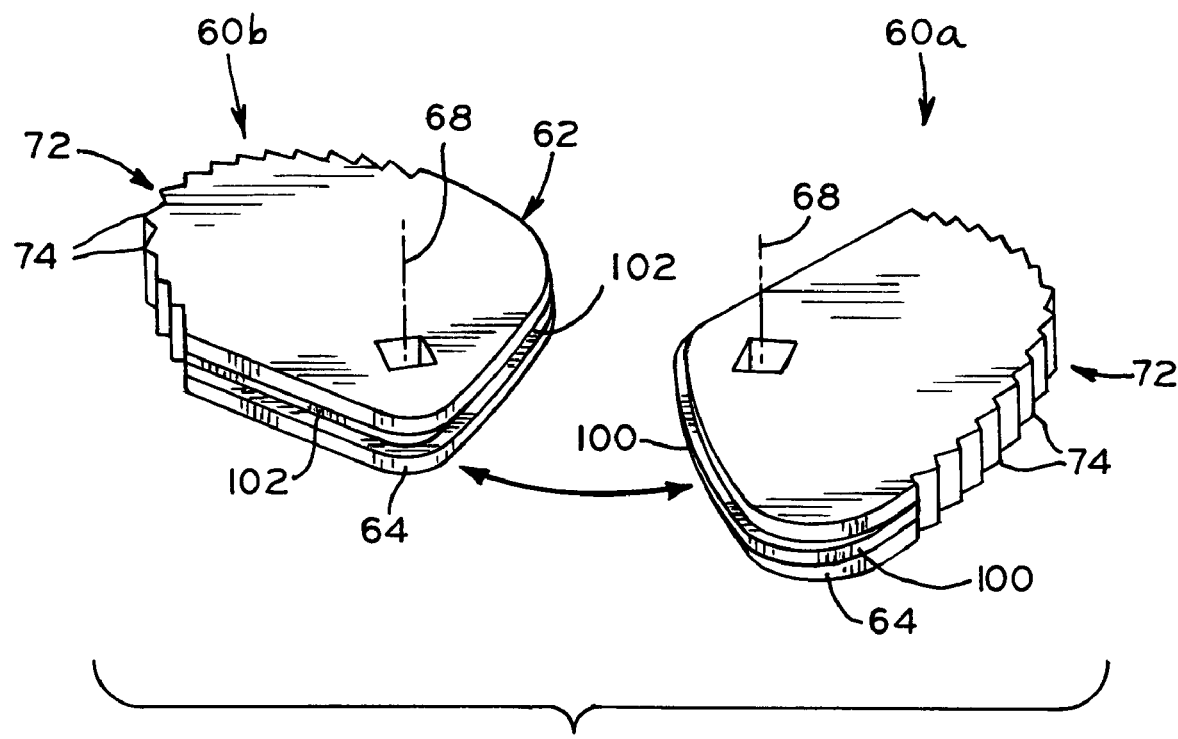
FIG. 8 is a perspective view of cam members according to an alternative embodiment, the cam members including interlocking tongue-and-groove structure therebetween.
Figure 9:
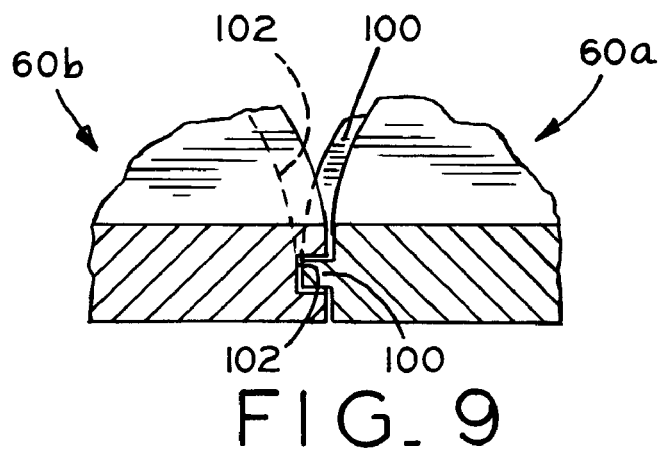
FIG. 9 is a sectional view through the cam members of FIG. 8.

Referring to FIGS. 8 and 9, cam members 60a and 60b may optionally include suitable cooperating structural features therebetween to enhance their contacting relationship, which is shown in FIGS. 8 and 9 as an interlocking tongue-and-groove structure, including tongue 100 disposed around cam surface 64 and straight side 71 of cam member 60a, which is received within groove 102 disposed around cam surface 64 and straight side 71 of cam member 60a. As cam members 60a and/or 60b are rotated in the manner described above to expand expansion ring 42, tongue 100 and groove 102 engage one another at varying points therealong to maintain the substantially co-planar orientation between cam members 60a and 60b, and thereby prevent movement of cam members 60a and 60b relative to one another in a direction generally perpendicular to longitudinal axis 70 of expansion ring 42. Although tongue 100 and groove 102 are shown herein extending all around cam surface 64 and straight side 71 of each cam member 60a and 60b, the lengths of tongue 100 and groove 102 may be modified as desired. For example, tongue 100 and groove 102 may extend only along a portion of cam surface 64 of cam members 60a and 60b, or the extent of tongue 100 and groove 102 may be different between cam members 60a and 60b. Further, other cooperating structures besides tongue 100 and groove 102 may be used.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An expansion ring assembly, comprising:
   a ring having first and second adjacent end portions;
   a first cam member disposed interiorly within said ring, said first cam member rotatably coupled to said first ring end portion, said first cam member having a cam surface engageable with at least a portion of said second ring end portion upon rotation of said first cam member to drive said first and second ring end portions apart from one another and thereby radially expand said ring, wherein said first cam member further includes a tool-receiving structure, said tool receiving structure coincident with an axis of rotation of said first cam member, in combination with:
   a wall having a substantially circular opening; and
   a resilient, substantially annular gasket fitted within said opening, said expansion ring assembly disposed within said gasket such that rotation of said first cam member in a first direction drives said first and second ring end portions apart from one another to thereby radially expand said ring and radially compress said gasket against said opening.

2. The expansion ring assembly of claim 1, further comprising an oversleeve element overlapping said first and second end portions of said ring.

3. An expansion ring assembly for use in radially expanding a gasket into sealing relationship with an opening in a wall, said expansion ring assembly comprising:
   a ring defining a longitudinal axis coincident with a center of said ring, said ring having first and second adjacent end portions;
   a first cam member rotatably coupled to said first ring end portion about a rotation axis, said rotation axis is perpendicular to said longitudinal axis, said first cam member having a cam surface engageable with at least a portion of said second ring end portion upon rotation of said first cam member to drive said first and second ring end portions apart from one another and thereby radially expand said ring, wherein said first cam member is rotatably coupled to said first ring end portion via a one-way clutch mechanism which allows rotation of said first cam member in a first direction and prevents rotation of said first cam member in a second direction opposite said first direction.

4. The expansion ring assembly of claim 3, further comprising an oversleeve element overlapping said first and second end portions of said ring.

5. An expansion ring assembly for use in radially expanding a gasket into sealing relationship with an opening in a wall, said expansion ring assembly comprising:
   a ring defining a longitudinal axis coincident with a center of said ring, said ring having first and second adjacent end portions;
   a first cam member rotatably coupled to said first ring end portion about a rotation axis, said rotation axis is perpendicular to said longitudinal axis, said first cam member having a cam surface engageable with at least a portion of said second ring end portion upon rotation of said first cam member to drive said first and second ring end portions apart from one another and thereby radially expand said ring, wherein said first cam member further includes a plurality of ratchet teeth, and said first ring end portion includes a ratchet pawl sequentially engageable with said ratchet teeth upon rotation of said first cam member in a first direction to thereby prevent rotation of said first cam member in a second direction opposite said first direction.

6. The expansion ring assembly of claim 5, further comprising an oversleeve element overlapping said first and second end portions of said ring.

7. An expansion ring assembly, comprising:
   a ring defining a longitudinal axis coincident with a center of said ring, said ring having first and second adjacent end portions;
   a first cam member disposed interiorly within said ring, said first cam member rotatably coupled to said first ring end portion about a rotation axis which extends along a direction perpendicular to said longitudinal axis, said first cam member having a cam surface engageable with at least a portion of said second ring end portion upon rotation of said first cam member to drive said first and second ring end portions apart from one another and thereby radially expand said ring, in combination with:
   a wall having a substantially circular opening; and
   a resilient, substantially annular gasket fitted within said opening, said expansion ring assembly disposed within said gasket such that rotation of said first cam member in a first direction drives said first and second ring end portions apart from one another to thereby radially expand said ring and radially compress said gasket against said opening.

8. The expansion ring assembly of claim 7, further comprising an oversleeve element overlapping said first and second ring end portions.

9. The expansion ring assembly of claim 7, comprising first and second cam members rotatably coupled to said first and second ring end portions, respectively, said first and second cam members each having a cam surface engageable with the other cam member upon rotation thereof to drive said first and second ring end portions apart from one another and thereby radially expand said ring.

10. The expansion ring assembly of claim 9, wherein said first and second cam members are each rotatable in the same direction to engage the cam surfaces thereof with one another.

11. An expansion ring assembly, comprising:
    a ring having first and second adjacent end portions;
    first and second cam members rotatably coupled to said first and second end portions, respectively, said first and second cam members each having a cam surface engageable with the other cam member upon rotation thereof to drive said first and second ring end portions apart from one another and thereby radially expand said ring, wherein said first and second cam members each further include a tool-receiving structure, said tool-receiving structures coincident with respective rotational axes of said first and second cam members, in combination with:
a wall having a substantially circular opening; and
a resilient, substantially annular gasket fitted within said opening, said expansion ring assembly disposed within said gasket such that rotation of said first and second cam members drives said first and second ring end portions apart from one another to thereby radially expand said ring and radially compress said gasket against said opening.

12. The expansion ring assembly of claim 11, further comprising an oversleeve element overlapping said first and second end portions of said ring.

13. An expansion ring assembly for use in radially expanding a gasket into sealing relationship with an opening in a wall, said expansion ring assembly, comprising:
a ring defining a longitudinal axis coincident with a center of said ring, said ring having first and second adjacent end portions;
first and second cam members rotatably coupled to said first and second end portions each about a respective rotation axis, each said rotation axis is perpendicular to said longitudinal axis, respectively, said first and second cam members each having a cam surface engageable with the other cam member upon rotation thereof to drive said first and second ring end portions apart from one another and thereby radially expand said ring, wherein said first and second cam members are rotatably coupled to said first and second ring end portions, respectively, via one-way clutch mechanisms which allow rotation of each of said first and second cam members in a first direction and prevent rotation of said first and second cam members in a second direction opposite said first direction.

14. The expansion ring assembly of claim 13, further comprising an oversleeve element overlapping said first and second end portions of said ring.

15. An expansion ring assembly for use in radially expanding a gasket into sealing relationship with an opening in a wall, said expansion ring assembly, comprising:
a ring defining a longitudinal axis coincident with a center of said ring, said ring having first and second adjacent end portions;
first and second cam members rotatably coupled to said first and second end portions each about a respective rotation axis, each said rotation axis is perpendicular to said longitudinal axis, respectively, said first and second cam members each having a cam surface engageable with the other cam member upon rotation thereof to drive said first and second ring end portions apart from one another and thereby radially expand said ring, wherein said first and second cam members each further include a plurality of ratchet teeth, and said first and second ring end portions each include a ratchet pawl sequentially engageable with respective said ratchet teeth of said first and second cam members upon rotation of said first and second cam members in a first direction to thereby prevent rotation of said first and second cam members in a second direction opposite said first direction.

16. The expansion ring assembly of claim 15, further comprising an oversleeve element overlapping said first and second end portions of said ring.

17. An expansion ring assembly, comprising:
a ring defining a longitudinal axis coincident with a center of said ring, said ring having first and second adjacent end portions;
first and second cam members each disposed interiorly within said ring, said first and second cam members rotatably coupled to said first and second end portions each about a respective rotation axis, each said rotation axis extending along a direction perpendicular to said longitudinal axis, respectively, said first and second cam members each having a cam surface engageable with the other cam member upon rotation thereof to drive said first and second ring end portions apart from one another and thereby radially expand said ring, in combination with:
a wall having a substantially circular opening; and
a resilient, substantially annular gasket fitted within said opening, said expansion ring assembly disposed within said gasket such that rotation of said first cam member in said first direction drives said first and second ring end portions apart from one another to thereby radially expand said ring and radially compress said gasket against said opening.

18. The expansion ring assembly of claim 17, further comprising an oversleeve element overlapping said first and second end portions of said ring.

19. The expansion ring assembly of claim 17, wherein said first and second cam members are each rotatable in the same direction to engage the cam surfaces thereof with one another.

* * * * *